(12) United States Patent
Xu et al.

(10) Patent No.: US 11,561,422 B2
(45) Date of Patent: Jan. 24, 2023

(54) DISPLAY MODULE AND VEHICLE-MOUNTED DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Haifeng Xu, Beijing (CN); Kaiwen Wang, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/417,459

(22) PCT Filed: Nov. 26, 2020

(86) PCT No.: PCT/CN2020/131728
§ 371 (c)(1),
(2) Date: Jun. 23, 2021

(87) PCT Pub. No.: WO2021/104361
PCT Pub. Date: Jun. 3, 2021

(65) Prior Publication Data
US 2022/0057671 A1    Feb. 24, 2022

(30) Foreign Application Priority Data
Nov. 29, 2019    (CN) .................. 201911202513.X (51) Int. Cl.
G02F 1/1333    (2006.01)
G02F 1/1335    (2006.01)
B60K 35/00    (2006.01)

(52) U.S. Cl.
CPC ........ *G02F 1/133317* (2021.01); *B60K 35/00* (2013.01); *G02F 1/13338* (2013.01);
(Continued)

(58) Field of Classification Search
None
See application file for complete search history.

(56) References Cited

U.S. PATENT DOCUMENTS 9,958,718 B2    5/2018    Shin et al.
2009/0185101 A1*    7/2009    Matsuhira ............. G02F 1/1339
445/24

(Continued)

FOREIGN PATENT DOCUMENTS

CN    103869509 A    6/2014
CN    104991302 A * 10/2015
(Continued)

*Primary Examiner* — Shan Liu
(74) *Attorney, Agent, or Firm* — Chiwin Law LLC (57) ABSTRACT

A display module and a vehicle-mounted display device are disclosed. The display module includes a middle frame, a display panel and an elastic adhesive body; the middle frame includes a first frame body, being arranged around an opening region and having a bearing surface; the display panel includes a middle portion and an edge portion; the adhesive body is located between the bearing surface and the edge portion; the middle frame further includes a second frame body, located at an edge of the first frame body and, the second frame body is located at a side of the first frame body away from the display panel, and an orthographic projection of the edge portion on a plane where the bearing surface is located at least partially overlaps with an orthographic projection of the second frame body on the plane where the bearing surface is located.

15 Claims, 3 Drawing Sheets

(52) U.S. Cl.
CPC .. *G02F 1/133314* (2021.01); *G02F 1/133325* (2021.01); *G02F 1/133512* (2013.01); *G02F 1/133531* (2021.01); *B60K 2370/152* (2019.05)

(56) References Cited

U.S. PATENT DOCUMENTS

| | | | | |
|---|---|---|---|---|
| 2013/0050820 A1* | 2/2013 | Shin | .................. | G02F 1/133308 |
| | | | | 361/679.01 |
| 2014/0176849 A1* | 6/2014 | Lee | .................. | G02F 1/133308 |
| | | | | 349/58 |
| 2014/0368747 A1* | 12/2014 | Lee | ........................ | H04N 5/645 |
| | | | | 348/794 |
| 2015/0355498 A1* | 12/2015 | Yoshida | ............ | G02F 1/133308 |
| | | | | 349/110 |
| 2016/0342015 A1 | 11/2016 | Jung et al. | | |
| 2017/0017108 A1* | 1/2017 | Shin | .................. | G02F 1/133308 |
| 2018/0011367 A1* | 1/2018 | Tanaka | ...................... | B32B 5/18 |
| 2018/0295729 A1* | 10/2018 | Meng | .................. | H05K 5/0017 |

FOREIGN PATENT DOCUMENTS

| | | | | | |
|---|---|---|---|---|---|
| CN | 106338853 | A | | 1/2017 | |
| CN | 106353904 | A | | 1/2017 | |
| CN | 106814500 | A | * | 6/2017 | |
| CN | 208314416 | U | | 1/2019 | |
| CN | 209373961 | U | | 9/2019 | |
| KR | 20170077903 | A | * | 7/2017 | |
| WO | WO-2018205686 | A1 | * | 11/2018 | ........... G02B 6/0055 |

\* cited by examiner

DISPLAY MODULE AND VEHICLE-MOUNTED DISPLAY DEVICE

This application is a U.S. National Phase Entry of International Application No. PCT/CN2020/131728 filed on Nov. 26, 2020, designating the United States of America and claiming priority to Chinese Patent Application No. 201911202513.X, filed on Nov. 29, 2019. The present application claims priority to and the benefit of the above-identified applications and the above-identified applications are incorporated by reference herein in their entirety.

TECHNICAL FIELD

Embodiments of the present disclosure relate to a display module and a vehicle-mounted display device.

BACKGROUND

With the development of vehicle-mounted display devices, in order to allow drivers to watch the contents displayed on the vehicle-mounted display devices without affecting normal driving, the vehicle-mounted display devices have gradually developed from embedded vehicle-mounted display devices embedded in the dashboard to floating vehicle-mounted display devices standing above the dashboard body.

SUMMARY

The embodiments of the present disclosure provide a display module and a vehicle-mounted display device. The display module includes a middle frame, a display panel and an elastic adhesive body. The middle frame includes an opening region and a first frame body surrounding the opening region, and the first frame body has a bearing surface. The display panel includes a middle portion and an edge portion surrounding the middle portion. The elastic adhesive body is located between the bearing surface and the edge portion of the display panel to fix the edge portion on the bearing surface. The middle frame also includes a second frame body, and the second frame body is located at the edge of the first frame body and extends in a first direction intersecting with the bearing surface of the first frame body. The second frame body is located at a side of the first frame body away from the display panel, and the orthographic projection of the edge portion on the plane where the bearing surface is located at least partially overlaps with the orthographic projection of the second frame body on the plane where the bearing surface is located. Therefore, the display module can greatly reduce the width of the frame of the display module on the premise of ensuring the stable fixation of the display panel, thereby realizing narrow frame design or even frameless design.

At least one embodiment of the present disclosure provides a display module. The display module includes a middle frame, including a first frame body, the first frame body being arranged around an opening region and having a bearing surface; a display panel, including a middle portion and an edge portion surrounding the middle portion; and an elastic adhesive body, located between the bearing surface and the edge portion of the display panel to fix the edge portion on the bearing surface, the middle frame further includes a second frame body, the second frame body is located at an edge of the first frame body and extends in a first direction intersecting with the bearing surface of the first frame body, the second frame body is located at a side of the first frame body away from the display panel, and an orthographic projection of the edge portion on a plane where the bearing surface is located at least partially overlaps with an orthographic projection of the second frame body on the plane where the bearing surface is located.

For example, in the display module provided by an embodiment of the present disclosure, an edge of the display panel is aligned with an edge of the second frame body away from the opening region.

For example, the display module provided by an embodiment of the present disclosure further includes a frame adhesive tape, wherein one end of the frame adhesive tape is arranged at a side of the edge portion of the display panel away from the bearing surface and bonded with the edge portion, and the other end of the frame adhesive tape is arranged at a side of the second frame body away from the opening region and bonded with the second frame body.

For example, in the display module provided by an embodiment of the present disclosure, the frame adhesive tape is arranged around edges of the display panel.

For example, in the display module provided by an embodiment of the present disclosure, the frame adhesive tape has light shielding property.

For example, the display module provided by an embodiment of the present disclosure further includes: a curing adhesive, located at a side of the edge portion of the display panel away from the first frame body, an orthographic projection of the curing adhesive on the first frame body covers an orthographic projection of the frame adhesive tape on the first frame body.

For example, the display module provided by an embodiment of the present disclosure further includes: a touch layer, located at a side of the display panel away from the middle frame; and a transparent adhesive body, located between the middle portion of the display panel and the touch layer, the curing adhesive is located between the edge portion of the display panel and the touch layer, the curing adhesive is arranged on a same layer as the transparent adhesive body and surrounds the transparent adhesive body.

For example, in the display module provided by an embodiment of the present disclosure, the display panel includes a polarizer, and the polarizer is located at a side of the display panel away from the middle frame, a distance between an edge of the polarizer and an edge of the display panel ranges from 1.0 mm to 1.3 mm, one end of the frame adhesive tape arranged on the edge portion is arranged on a same layer as the polarizer.

For example, in the display module provided by an embodiment of the present disclosure, the curing adhesive is in contact with the frame adhesive tape and the polarizer at the same time.

For example, in the display module provided by an embodiment of the present disclosure, a thickness of the frame adhesive tape ranges from 0.06 mm to 0.08 mm.

For example, the display module provided by an embodiment of the present disclosure further includes: a backlight assembly, located at a side of the first frame body away from the display panel; and a rear plate, including a plate-shaped main body and a third frame body, wherein the plate-shaped main body is located at a side of the backlight assembly away from the display panel, and the third frame body is located at an edge of the plate-shaped main body and extends in a second direction intersecting with the plate-shaped main body, the third frame body is located at a side of the second frame body close to the opening region and connected with the first frame body.

For example, in the display module provided by an embodiment of the present disclosure, the elastic adhesive body is configured to be elastically compressible in a direction perpendicular to the bearing surface, and an elastic modulus of the elastic adhesive body is less than 100 MPa.

For example, in the display module provided by an embodiment of the present disclosure, the elastic adhesive body includes foam adhesive.

For example, in the display module provided by an embodiment of the present disclosure, the edge portion of the display panel includes a light shielding adhesive.

For example, in the display module provided by an embodiment of the present disclosure, an orthographic projection of the middle portion of the display panel on the plane where the bearing surface is located completely coincides with the opening region.

For example, in the display module provided by an embodiment of the present disclosure, the first frame body and the second frame body are integrally formed.

At least one embodiment of the present disclosure further provides a vehicle-mounted display device, which includes the abovementioned display module.

BRIEF DESCRIPTION OF THE DRAWINGS

In order to more clearly illustrate the technical solution of the embodiments of the present disclosure, the drawings of the embodiments will be briefly described in the following. It is obvious that the described drawings below are only related to some embodiments of the present disclosure without constituting any limitation thereto.

DETAILED DESCRIPTION

In order to make objectives, technical details and advantages of the embodiments of the present disclosure more clearly, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "include," "including," "comprise," "comprising," etc., are intended to specify that the elements or the objects stated before these terms encompass the elements or the objects and equivalents thereof listed after these terms, but do not preclude the other elements or objects.

In the research, the inventor(s) of the present application noticed that, with the popularity of floating vehicle-mounted display devices, people are increasingly pursuing the narrow frame design of vehicle-mounted display devices.

Figure 1:
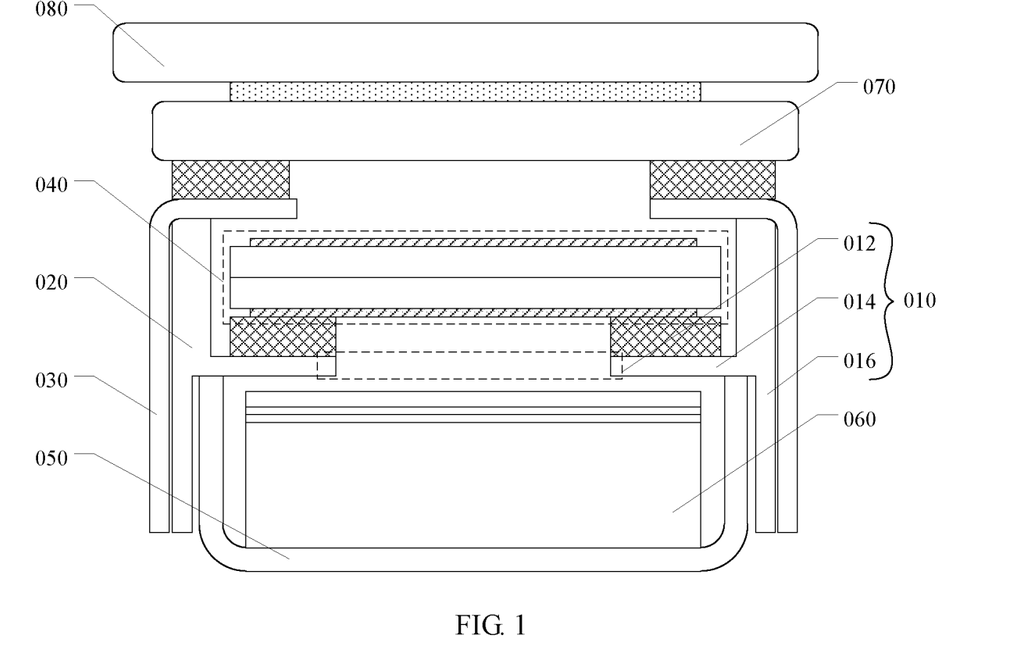
FIG. 1 is a schematic structural diagram of a display module.

FIG. 1 is a schematic structural diagram of a display module. As illustrated in FIG. 1, the display module includes a middle frame 010, a plastic frame 020, a front frame 030, a display panel 040, a rear plate 050, a backlight assembly 060, a touch layer 070 and a cover plate 080. The middle frame 010 includes a first frame body 014 and a second frame body 016, the first frame body 014 is arranged around an opening region 012, and the second frame body 016 is arranged at the edge of the first frame body 014 and extends in a direction perpendicular to the first frame body 014. The plastic frame 020 is also arranged at the edge of the first frame body 014 and extends in the direction perpendicular to the first frame body 014. The first frame body 014 is used for bearing the display panel 040, the display panel 040 covers the opening region 012, the plastic frame 020 is located at a side of the first frame body 014 provided with the display panel 040, and the second frame body 016 is located at a side of the first frame body 014 away from the plastic frame 020. The second frame body 016 encloses an accommodation space, and the rear plate 050 and the backlight assembly 060 on the rear plate 050 can be arranged in the accommodation space to provide backlight for the display panel 040. The front frame 030 is arranged at the side of the plastic frame 020 away from the display panel 040, and is used for limiting and protecting the display panel 040. Therefore, the width of the frame of the display module is equal to the sum of the thickness of the front frame 030, the thickness of the plastic frame 020, the width of the peripheral region of the display panel 040, and the distance between the display panel 040 and the plastic frame 020. It can be seen that the width of the frame of the display module is large, which is not conducive to the realization of narrow frame design.

The embodiments of the present disclosure provide a display module and a vehicle-mounted display device. The display module includes a middle frame, a display panel and an elastic adhesive body. The middle frame includes an opening region and a first frame body surrounding the opening region, and the first frame body has a bearing surface. The display panel includes a middle portion and an edge portion surrounding the middle portion. The elastic adhesive body is located between the bearing surface and the edge portion of the display panel to fix the edge portion on the bearing surface. The middle frame also includes a second frame body, and the second frame body is located at the edge of the first frame body and extends in a first direction intersecting with the bearing surface of the first frame body. The second frame body is located at a side of the first frame body away from the display panel, and the orthographic projection of the edge portion on the plane where the bearing surface is located at least partially overlaps with the orthographic projection of the second frame body on the plane where the bearing surface is located. Therefore, the display module can greatly reduce the width of the frame of the display module on the premise of ensuring the stable fixation of the display panel, thereby realizing narrow frame design or even frameless design.

Hereinafter, the display module and the vehicle-mounted display device provided by the embodiments of the present disclosure will be described in detail with reference to the drawings.

Figure 2:
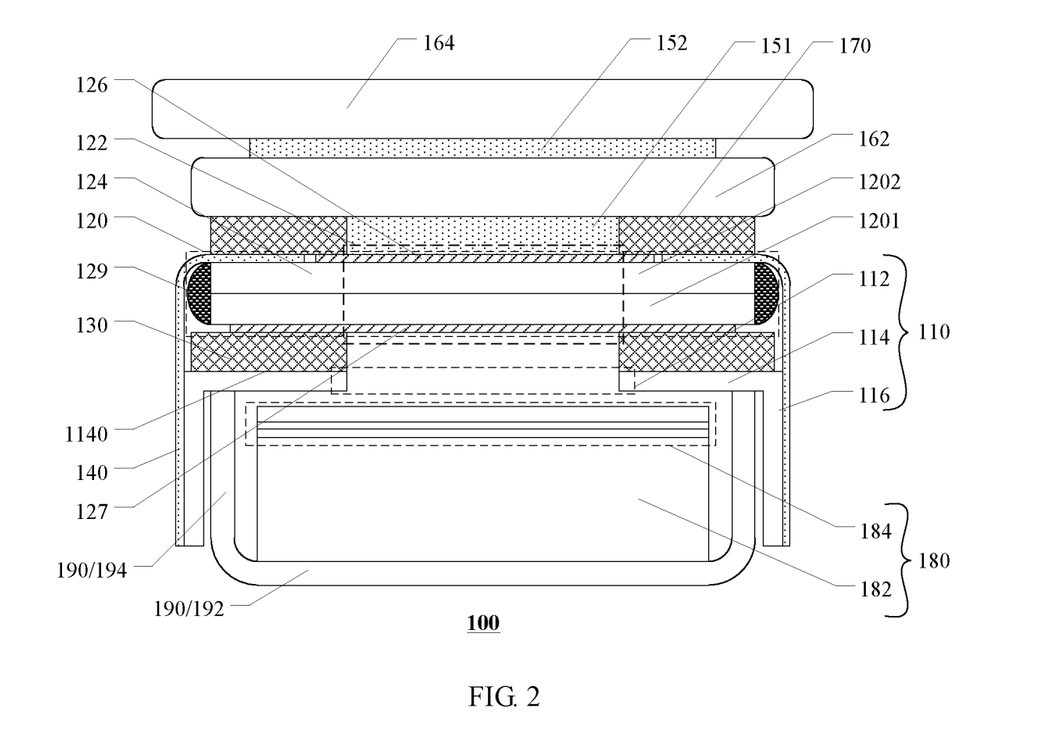
FIG. 2 is a schematic structural diagram of a display module according to an embodiment of the present disclosure.

FIG. 2 is a schematic structural diagram of a display module according to an embodiment of the present disclosure. As illustrated in FIG. 2, the display module 100 includes a middle frame 110, a display panel 120 and an elastic adhesive body 130. The middle frame 110 includes a first frame body 114, the first frame body 114 is arranged around the opening region 112 and has a bearing surface 1140. The display panel 120 includes a middle portion 122 and an edge portion 124 surrounding the middle portion 122. The elastic adhesive body 130 is located between the bearing surface 1140 and the edge portion 124 of the display panel 120 to fix the edge portion 124 on the bearing surface 1140. The middle frame 110 also includes a second frame body 116, the second frame body 116 is located at the edge of the first frame body 114 and extends in the first direction intersecting with the bearing surface 1140 of the first frame body 114. The second frame body 116 is located at a side of the first frame body 114 away from the display panel 120, and an orthographic projection of the edge portion 124 on a plane where the bearing surface 1140 at least partially overlaps with the orthographic projection of the second frame body 116 on the plane where the bearing surface 1140 is located.

In the display module provided by the embodiment of the present disclosure, the elastic adhesive body is located between the bearing surface and the edge portion of the display panel, so the elastic adhesive body can fix the edge portion on the bearing surface, and because the elastic adhesive body has elasticity, it can reduce the external force on the display panel and avoid the display panel from being squeezed and deformed. Therefore, the display module does not need to set a plastic frame and a front frame to fix the display panel. On the other hand, the orthographic projection of the edge portion on the plane where the bearing surface is located at least partially overlaps with the orthographic projection of the second frame body on the plane where the bearing surface is located, that is, the display module is not provided with a plastic frame and a front frame, so that the width of the frame of the display module is only equal to the sum of the distance from the edge portion to the edge of the second frame body (smaller than the width of the second frame body) and the width of the peripheral region of the display panel. It can be seen that the width of the frame of the display module is greatly reduced, so that a narrow frame design or even a frameless design can be realized.

In some examples, as illustrated in FIG. 2, the orthographic projection of the middle portion 122 of the display panel 120 on the plane where the bearing surface 1140 is located completely coincides with the opening region 112, that is, the division between the middle portion 122 and the edge portion 124 of the display panel 120 can be divided by the range of the opening region 112.

In some examples, the elastic adhesive body 130 is configured to be elastically compressible in the direction perpendicular to the bearing surface 1140, and the elastic modulus of the elastic adhesive body 130 is less than 100 MPa. Because the elastic adhesive body has certain elasticity, the display panel can move relative to the first frame body, that is, the elastic adhesive body can play a buffering role, thereby reducing the effect of external force on the display panel, avoiding the deformation of the display panel caused by being squeezed, and further reducing the probability of dark light leakage of the liquid crystal panel. It should be noted that the elastic adhesive body is double-sided adhesive tape, that is, the side of the elastic adhesive body close to the bearing surface and the side close to the edge portion are both adhesive surfaces.

In some examples, the elastic adhesive body can be foam adhesive. Of course, the embodiments of the present disclosure include but are not limited thereto, and the elastic adhesive body can also be other adhesive bodies with elastic compression and elastic modulus less than 100 MPa.

It should be noted that the edge portions of the above-mentioned display panel can be the edge portions of upper and lower substrates (such as array substrates and color film substrates) of the display panel, and can also be the edge portions of the display panel including the upper and lower substrates and the light shielding adhesive arranged on the edges of the upper and lower substrates. That is to say, the edge portions of the above-mentioned display panel are not limited to the edge portions of the upper and lower substrates of the display panel, but can also be the edge portions of the whole display panel including the upper and lower substrates and other components.

In some examples, as illustrated in FIG. 2, the edge portion 124 of the display panel 120 includes a light shielding adhesive 129, so that light leakage can be avoided at the edge of the display panel 120.

For example, as illustrated in FIG. 2, the display panel 120 includes an array substrate 1201 and a counter substrate 1202, which are cell-assembled. The light shielding adhesive 129 is arranged at the edges of the array substrate 1201 and the counter substrate 1202.

In some examples, as illustrated in FIG. 2, the edge of the display panel 120 is aligned with the edge (i.e., the outer edge) of the second frame body 116 away from the opening region 112, thereby further reducing the width of the frame of the display module. For example, because the second frame body 116 is located at the edge of the first frame body 114, the edge of the display panel 120 is also aligned with the outer edge of the first frame body 114.

In some examples, as illustrated in FIG. 2, the display module 100 further includes a frame adhesive tape 140. One end of the frame adhesive tape 140 is arranged at the side of the edge portion 124 of the display panel 120 away from the bearing surface 1140 and bonded with the edge portion 124, while the other end of the frame adhesive tape 140 is arranged at the side of the second frame body 116 away from the opening region 112 and bonded with the second frame body 116, that is, the frame adhesive tape 140 is bent and attached to the edge portion 124 and the second frame body 116 to further fix the display panel 120 to the middle frame 116. Therefore, even if the display module is not provided with a plastic frame and a front frame, the display module still has a good fixing effect on the display panel, thereby preventing the display panel from being separated from the middle frame because of periodic touch. Therefore, the display module can greatly reduce the width of the frame of the display module while ensuring better fixing effect and protection effect.

In some examples, as illustrated in FIG. 2, the first frame body 114 and the second frame body 116 can be integrally formed, so that the structure of the middle frame 110 is more stable.

In some examples, as illustrated in FIG. 2, the first direction is perpendicular to the bearing surface 1140, that is, the included angle between the second frame body 116 and the first frame body 114 is approximately equal to 90 degrees.

Figure 3:
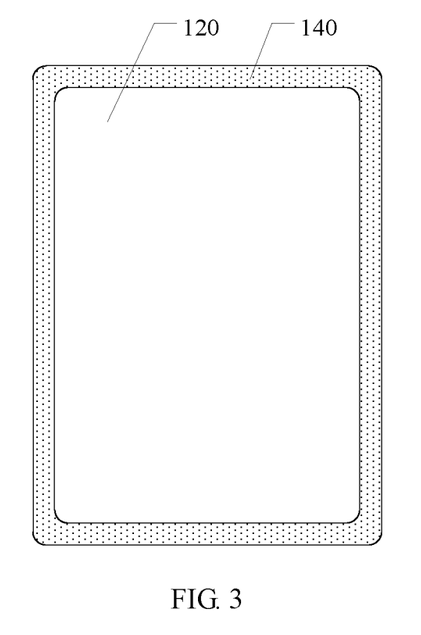
FIG. 3 is a schematic plan view of a display module according to an embodiment of the present disclosure.

FIG. 3 is a schematic plan view of a display module according to an embodiment of the present disclosure. As illustrated in FIG. 3, the frame adhesive tape 140 is arranged around the edges of the display panel 120, so that the display panel 120 can be better fixed and protected.

For example, as illustrated in FIG. 3, the planar shape of the display panel 120 is approximately rectangular, for example, a rectangle with rounded corners at the top corners. At this time, the planar shape of the frame adhesive tape 140 is approximately a rectangular ring. Similarly, in the case where the planar shape of the display panel is approximately rectangular, the planar shapes of the first frame body and the second frame body are rectangular rings. Of course, the embodiments of the present disclosure include but are not limited thereto, and the planar shape of the display panel can also be other shapes.

Figure 4:
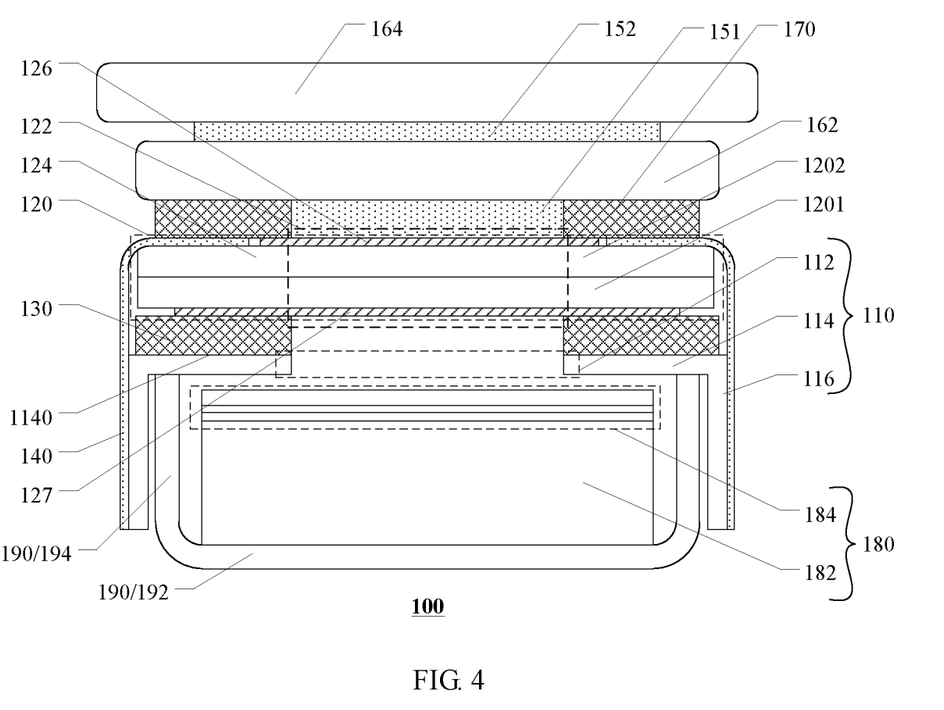
FIG. 4 is a schematic structural diagram of another display module according to an embodiment of the present disclosure.

FIG. 4 is a schematic structural diagram of another display module according to an embodiment of the present disclosure. As illustrated in FIG. 4, the frame adhesive tape 140 has light shielding property, for example, the frame adhesive tape 140 does not transmit light, so that it can also shield the edge of the display panel 120. Therefore, the edge of the display panel 120 may not be provided with the light shielding adhesive. In some examples, as illustrated in FIG. 2 and FIG. 4, the display module 100 further includes a curing adhesive 170 located at the side of the edge portion 124 of the display panel 120 away from the first frame body 114, and the orthographic projection of the curing adhesive 170 on the first frame body 114 covers the orthographic projection of the frame adhesive tape 140 on the first frame body 114, that is, the curing adhesive 170 can cover the frame adhesive tape 140, thus preventing the part of the frame adhesive tape 140 located on the edge portion 124 from tilting, and improving the stability and durability of the display module.

In some examples, as illustrated in FIGS. 2 and 4, the display module 100 further includes: a touch layer 162, located at the side of the display panel 120 away from the middle frame 110; a transparent adhesive body 151, located between the middle portion 122 of the display panel 120 and the touch layer 162, and the curing adhesive 170 is located between the edge portion 124 of the display panel 120 and the touch layer 162, the curing adhesive 170 is arranged on a same layer as the transparent adhesive body 151 and surrounds the transparent adhesive body 151. Therefore, the display module can realize the touch function through the touch layer, and can also adhere the touch layer to the display panel through the transparent adhesive body. In addition, because the curing adhesive is arranged on the same layer as the transparent adhesive body and around the transparent adhesive body, the curing adhesive can also be used as a light shielding structure, thereby preventing the light leakage phenomenon at the edge of the display module. It should be noted that the above-mentioned "arranged on the same layer" refers to that the curing adhesive and the transparent adhesive body do not overlap with each other and both are located between the touch layer and the display panel.

For example, the touch layer can adopt a self-capacitance touch structure or a mutual capacitance touch structure, and the embodiments of the present disclosure are not limited here. For example, the touch layer can include a plurality of touch driving electrodes and a plurality of touch sensing electrodes to realize the touch function.

For example, the above-mentioned curing adhesive can be room temperature vulcanized silicone rubber (RTV adhesive), of course, the embodiments of the present disclosure include but are not limited thereto, and the curing adhesive can also be other types of curing adhesive. The transparent adhesive body can be transparent optical adhesive (OC adhesive). Of course, the embodiments of the present disclosure include but are not limited thereto, and the transparent adhesive body can also be other transparent adhesive bodies.

In some examples, as illustrated in FIGS. 2 and 4, the display panel 120 further includes a polarizer 126, which is located at the side of the display panel 120 away from the middle frame 110, and the edge of the polarizer 126 is retracted from the edge of the display panel 120 to the center of the opening region 112 by 1.0 mm-1.3 mm, that is, the distance between the edge of the polarizer 126 and the outer edge of the display panel 120 ranges from 1.0 mm to 1.1 mm. One end of the frame adhesive tape 140 arranged on the edge portion 124 is arranged on the same layer as the polarizer 126. According to the display module, the polarizer is shrunk inward, so that the frame adhesive tape can directly contact with the upper substrate of the display panel, thereby enhancing the fixation firmness. Therefore, the display module can ensure the fixing firmness of the display panel on the premise that the fitting area of the frame adhesive tape and the display panel is as small as possible.

In some examples, as illustrated in FIGS. 2 and 4, the curing adhesive 170 is in contact with the frame adhesive tape 140 and the polarizer 126 at the same time, that is, the curing adhesive 170 covers the frame adhesive tape 140 and the polarizer 126 at the same time. Because the frame adhesive tape 140 is arranged on the same layer as the polarizer 170, the edge of the curing adhesive 170 close to the center of the opening region exceeds the edge of the frame adhesive tape 140 close to the center of the opening region, and the curing adhesive 170 is in contact with the frame adhesive tape 140 and the polarizer 126 at the same time, the curing adhesive 170 can better press the part of the frame adhesive tape 140 located on the edge portion 124 and fix the frame adhesive tape 140, the polarizer 126 and the edge portion 124, thereby further improving the stability and durability of the display module.

In some examples, the thickness of the frame adhesive tape 140 ranges from 0.06 mm to 0.08 mm. It can be seen that the thickness of the frame adhesive tape is thin, which has little influence on the width of the frame, and is beneficial to the realization of narrow frame design.

In some examples, as illustrated in FIGS. 2 and 4, the display panel 120 further includes an upper polarizer 126 and a lower polarizer 127. The upper polarizer 126 is located at the side of the display panel 120 away from the middle frame 110, and the lower polarizer 127 is located at the side of the display panel 120 close to the middle frame 110.

In some examples, as illustrated in FIGS. 2 and 4, the display module 100 further includes a backlight assembly 180 and a rear plate 190. The backlight assembly 180 is located at the side of the first frame body 112 away from the display panel 120, that is, below the display panel 120. The rear plate 190 includes a plate-shaped main body 192 and a third frame body 194, the plate-shaped main body 192 is located at the side of the backlight assembly 180 away from the display panel 120, the third frame body 194 is located at the edge of the plate-shaped main body 192 and extending in a second direction intersecting with the plate-shaped main body 192, the third frame body 194 is located at a side of the second frame body 116 close to the opening region 112 and connected with the first frame body 114. The rear plate 190 can be used to carry the backlight assembly 180, and the backlight assembly 180 can provide backlight for the display panel 120.

For example, the backlight assembly 180 can include a light guide plate 182 and an optical film 184, so that uniformity and dispersion of the backlight can be improved.

In some examples, a driving circuit (not illustrated) and a light emitting element (not illustrated) can also be provided on the plate-shaped main body 192 of the rear plate 190, thereby providing a light source. In addition, the rear plate can also realize regional dimming through a driving circuit.

In some examples, as illustrated in FIGS. 2 and 4, because of the above structure, the area of the display panel 120 can be larger than the area of the plate-shaped main body 192. It can be seen that the display module has a narrow frame.

In some examples, as illustrated in FIGS. 2 and 4, the display module 100 further includes a cover plate 164 and a transparent adhesive body 152. The cover plate 164 is located at the side of the touch layer 162 or the display panel 120 away from the middle frame 110. The transparent adhesive body 152 is located between the touch layer 162 and the cover plate 164 to attach the cover plate 164 to the touch layer 162, thereby protecting the display module.

For example, the above-mentioned cover plate can be a glass cover plate. Of course, the embodiments of the present disclosure include but are not limited thereto, and the cover plate can also be made of other materials.

Figure 5:
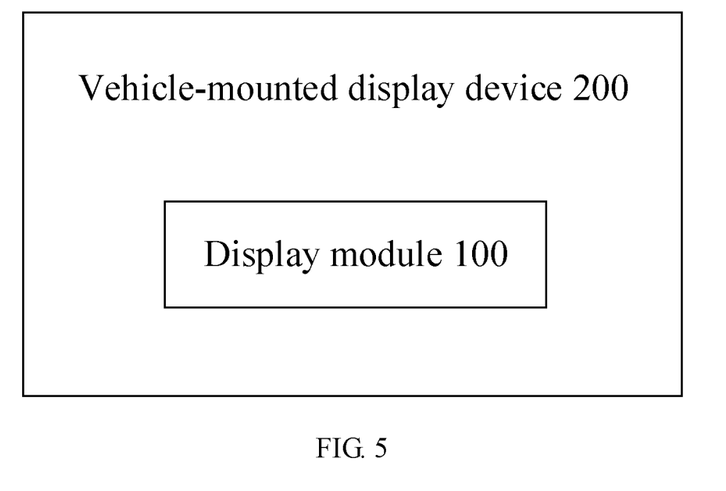
FIG. 5 is a schematic diagram of a vehicle-mounted display device according to an embodiment of the present disclosure.

At least one embodiment of the present disclosure further provides a vehicle-mounted display device. FIG. 5 is a schematic diagram of a vehicle-mounted display device according to an embodiment of the present disclosure. As illustrated in FIG. 5, the vehicle-mounted display device 200 includes the above-mentioned display module 100. Therefore, the vehicle-mounted display device also has the beneficial effects of the display module included in the vehicle-mounted display device, that is, it has a narrow frame, high stability and high durability. For details, please refer to the relevant descriptions of the above embodiments, and they will not be repeated here.

It should be noted that the entire structure of the display device is not illustrated for clarity. In order to realize the necessary functions of the display device, those skilled in the art can set other structures not illustrated according to specific application scenarios, which is not limited by the present disclosure.

The following statements need to be explained:

(1) In the drawings of the embodiments of the present disclosure, only the structures related to the embodiments of the present disclosure are involved, and other structures may refer to the common design(s).

(2) In case of no conflict, features in one embodiment or in different embodiments of the present disclosure can be combined.

The above are merely exemplary embodiments of the present disclosure but are not limitative to the scope of the present disclosure; any person familiar with this technical field can easily think of changes or substitutions within the technical scope disclosed in this disclosure, which should be covered within the protection scope of this disclosure. Therefore, the scopes of the present disclosure should be defined in the appended claims.

The invention claimed is:

1. A display module, comprising:
a middle frame, comprising a first frame body, the first frame body being arranged around an opening region and having a bearing surface;
a display panel, comprising a middle portion and an edge portion surrounding the middle portion; and
an elastic adhesive body, located between the bearing surface and the edge portion of the display panel to fix the edge portion on the bearing surface,
wherein the middle frame further comprises a second frame body, the second frame body is located at an edge of the first frame body and extends in a first direction intersecting with the bearing surface of the first frame body, the second frame body is located at a side of the first frame body away from the display panel, and an orthographic projection of the edge portion on a plane where the bearing surface is located at least partially overlaps with an orthographic projection of the second frame body on the plane where the bearing surface is located, and
the display module further comprising:
a frame adhesive tape, one end of the frame adhesive tape is arranged at a side of the edge portion of the display panel away from the bearing surface and bonded with the edge portion, and the other end of the frame adhesive tape is arranged at a side of the second frame body away from the opening region and bonded with the second frame body; and
a curing adhesive, located at a side of the edge portion of the display panel away from the first frame body,
wherein an orthographic projection of the curing adhesive on the first frame body covers and goes beyond an orthographic projection of the frame adhesive tape on the first frame body, the orthographic projection of the curing adhesive on the first frame body is not overlapped with the opening region, a distance between the orthographic projection of the frame adhesive tape on the first frame body and the opening region is larger than a distance between the orthographic projection of the curing adhesive on the first frame body and the opening region.

2. The display module according to claim 1, wherein two opposite edges of the display panel are aligned with two opposite edges of the second frame body away from the opening region, respectively.

3. The display module according to claim 1, wherein the frame adhesive tape is arranged around edges of the display panel.

4. The display module according to claim 1, wherein the frame adhesive tape has light shielding property.

5. The display module according to claim 1, further comprising:
a touch layer, located at a side of the display panel away from the middle frame; and
a transparent adhesive body, located between the middle portion of the display panel and the touch layer,
wherein the curing adhesive is located between the edge portion of the display panel and the touch layer,
the curing adhesive is arranged on a same layer as the transparent adhesive body and surrounds the transparent adhesive body.

6. The display module according to claim 1, wherein the display panel comprises a polarizer, and the polarizer is located at a side of the display panel away from the middle frame,
a distance between an edge of the polarizer and an edge of the display panel ranges from 1.0 mm to 1.3 mm,
one end of the frame adhesive tape arranged on the edge portion is arranged on a same layer as the polarizer.

7. The display module according to claim 6, wherein the curing adhesive is in contact with the frame adhesive tape and the polarizer at the same time.

8. The display module according to claim 1, wherein a thickness of the frame adhesive tape ranges from 0.06 mm to 0.08 mm.

9. The display module according to claim 1, further comprising:
- a backlight assembly, located at a side of the first frame body away from the display panel; and
- a rear plate, comprising a plate-shaped main body and a third frame body, wherein the plate-shaped main body is located at a side of the backlight assembly away from the display panel, and the third frame body is located at an edge of the plate-shaped main body and extends in a second direction intersecting with the plate-shaped main body,
- wherein the third frame body is located at a side of the second frame body close to the opening region and connected with the first frame body.

10. The display module according to claim 1, wherein the elastic adhesive body is configured to be elastically compressible in a direction perpendicular to the bearing surface, and an elastic modulus of the elastic adhesive body is less than 100 MPa.

11. The display module according to claim 1, wherein the elastic adhesive body comprises foam adhesive.

12. The display module according to claim 1, wherein the edge portion of the display panel comprises a light shielding adhesive.

13. The display module according to claim 1, wherein an orthographic projection of the middle portion of the display panel on the plane where the bearing surface is located completely coincides with the opening region.

14. The display module according to claim 1, wherein the first frame body and the second frame body are integrally formed.

15. A vehicle-mounted display device, comprising the display module according to claim 1.

* * * * *